US012279273B2

(12) United States Patent
Ren et al.

(10) Patent No.: US 12,279,273 B2
(45) Date of Patent: Apr. 15, 2025

(54) SPAN BASED PDCCH SCHEDULING AND TRIGGERING

(71) Applicant: QUALCOMM Incorporated, San Diego, CA (US)

(72) Inventors: Yuwei Ren, Beijing (CN); Huilin Xu, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 479 days.

(21) Appl. No.: 17/756,030

(22) PCT Filed: Nov. 15, 2019

(86) PCT No.: PCT/CN2019/118850
§ 371 (c)(1),
(2) Date: May 13, 2022

(87) PCT Pub. No.: WO2021/092918
PCT Pub. Date: May 20, 2021

(65) Prior Publication Data
US 2022/0394746 A1    Dec. 8, 2022

(51) Int. Cl.
*H04W 72/0446*    (2023.01)
*H04W 72/23*    (2023.01)
(52) U.S. Cl.
CPC .................................. *H04W 72/23* (2023.01)

(58) Field of Classification Search
CPC ........................ H04W 72/23; H04W 72/0446
See application file for complete search history.

(56) References Cited

U.S. PATENT DOCUMENTS

| 10,420,088 | B2 | 9/2019 | Ang et al. |
| 2017/0171850 | A1 | 6/2017 | Ang et al. |
| 2019/0327755 | A1 | 10/2019 | Xiong et al. |
| 2022/0167194 | A1* | 5/2022 | Gao ...................... H04W 72/51 |
| 2022/0353698 | A1* | 11/2022 | Jang ...................... H04L 5/0053 |

FOREIGN PATENT DOCUMENTS

| CN | 110383737 A | 10/2019 |
| WO | 2017214054 | 12/2017 |
| WO | 2018031704 A1 | 2/2018 |

OTHER PUBLICATIONS

International Search Report and Written Opinion—PCT/CN2019/118850—ISA/EPO—Aug. 19, 2020.
Qualcomm Incorporated: "On Downlink Signals and Channels for Initial Access," R1-1811227, 3GPP TSG RAN WG1 Meeting #94b, Oct. 8-12, 2018 (Oct. 12, 2018), the whole document, 8 pages.

(Continued)

*Primary Examiner* — Kevin C. Harper
*Assistant Examiner* — Jia Hao Deng
(74) *Attorney, Agent, or Firm* — Arent Fox, LLP

(57) ABSTRACT

A user equipment transmits a processing time parameter to a base station. The UE receives a physical downlink control channel in a span. The span may be known at the UE. The PDCCH schedules a subsequent, scheduled channel with a timeline based on the last symbol of the span and the processing time parameter.

35 Claims, 13 Drawing Sheets

(56) References Cited

OTHER PUBLICATIONS

Qualcomm Incorporated: "Summary of DL/UL Scheduling and HARQ Management," R1-1803337, 3GPP TSG-RAN WG1 Meeting AH 1801, Feb. 26-Mar. 2, 2018 (Mar. 2, 2018), p. 7, pp. 1-20.
Qualcomm Incorporated: "UE Processing Time" R1-1714185, 3GPP TSG-RAN WG1 #90, Aug. 21-25, 2017 (Aug. 25, 2017), pp. 1-3, 5 pages.
Intel Corporation: "Summary of Discussion for NR Measurements for Mobility", 3GPP TSG RAN WG1 Meeting #94, R1-1809732 Summary_Mobility, 3rd Generation Partnership Project (3GPP), Mobile Competence Centre, 650, Route Des Lucioles, F-06921 Sophia-antipolis Cedex, France, vol. RAN WG1, No. Gothenburg, Sweden, Aug. 20, 2018-Aug. 24, 2018, 20 Pages, Aug. 21, 2018, XP051517093, Answer #2a/2b.
Supplementary European Search Report—EP19952925—Search Authority—The Hague—Jul. 20, 2023.

\* cited by examiner

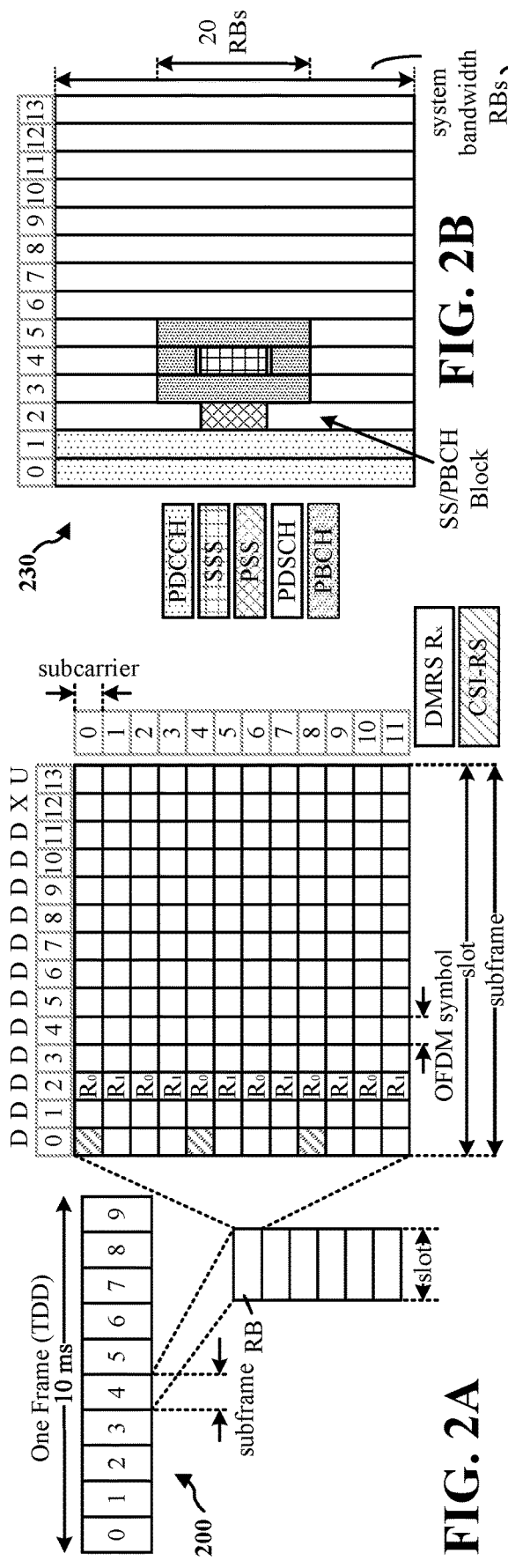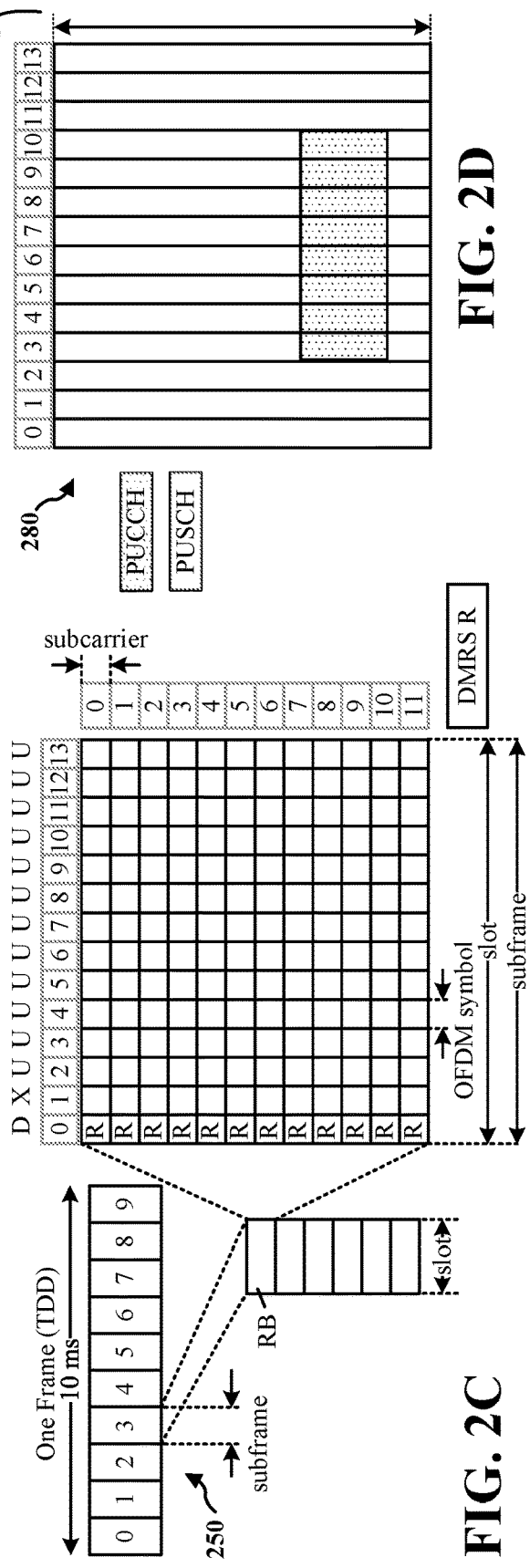

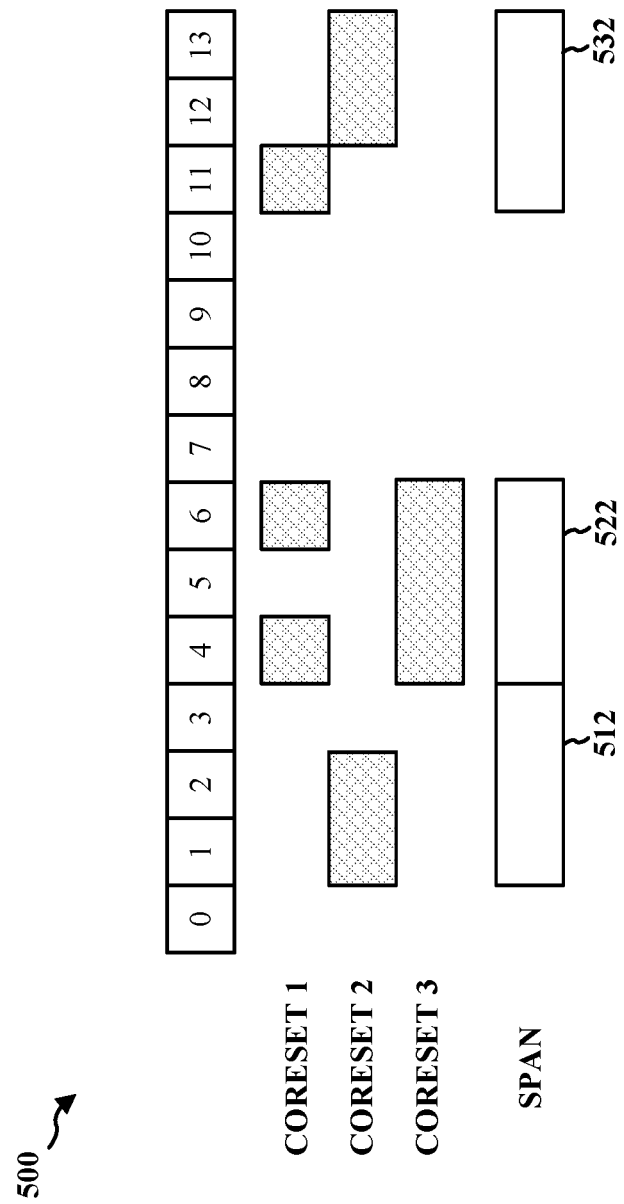

SPAN BASED PDCCH SCHEDULING AND TRIGGERING

CROSS REFERENCE TO RELATED APPLICATION(S)

This application is a National Phase entry of PCT Application No. PCT/CN2019/118850, entitled "SPAN BASED PDCCH SCHEDULING AND TRIGGERING" and filed on Nov. 15, 2019, which is expressly incorporated by reference herein in its entirety.

BACKGROUND

Technical Field

The present disclosure relates generally to communication systems, and more particularly, to a wireless communication system.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A user equipment (UE) may receive scheduling for a subsequent channel on a PDCCH. The scheduling may identify the starting symbol for the subsequent channel with a timeline corresponding to the number of symbols between the last symbol of the PDCCH and the first symbol of the subsequent channel. The UE may require processing resources to determine where the last symbol of the PDCCH is to determine where the first symbol of the subsequent channel will be.

According to aspects of the present disclosure, a UE transmits a processing time parameter to a base station. The base station transmits a PDCCH with downlink control information scheduling a subsequent scheduled channel, and determines the resources for the scheduled channel based on the processing time parameter of the UE and a span of the UE. The UE receives the PDCCH in the span. The span may be known at the UE. The PDCCH schedules the subsequent, scheduled channel with a timeline based on the last symbol of the span and the processing time parameter. Because the location of the last symbol of the span is known, and because it may correspond to multiple PDCCHs with different last symbols, the UE may reduce the processing resources required to determine the location of the first symbol of the scheduled channel.

In an aspect of the disclosure, a method, a computer-readable medium, and an apparatus are provided. The apparatus transmits a processing time parameter to a base station, the processing time parameter corresponding to a number of symbols; receives a PDCCH from a base station during a PDCCH monitoring occasion in a span; processes the PDCCH received in the PDCCH monitoring occasion to determine resources for a scheduled channel, a number of symbols between a last symbol of the span and an initial symbol of the determined resources being equal to or greater than the number of symbols of the processing time parameter; and transmits or receives data on the scheduled channel based on the processed PDCCH.

In an aspect of the disclosure, a method, a computer-readable medium, and an apparatus are provided. The apparatus receives a processing time parameter from a user equipment (UE), the processing time parameter corresponding to a number of symbols; determines resources for a scheduled channel based on a last symbol of a span of the UE and the processing time parameter; transmits a physical downlink control channel (PDCCH) transmission to the UE during a PDCCH monitoring occasion in the span of the UE, the PDCCH indicating the determined resources for the scheduled channel; and receives or transmits data on the scheduled channel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 5 is a diagram illustrating PDCCH scheduling option for a UE.

DETAILED DESCRIPTION

Figure 1:
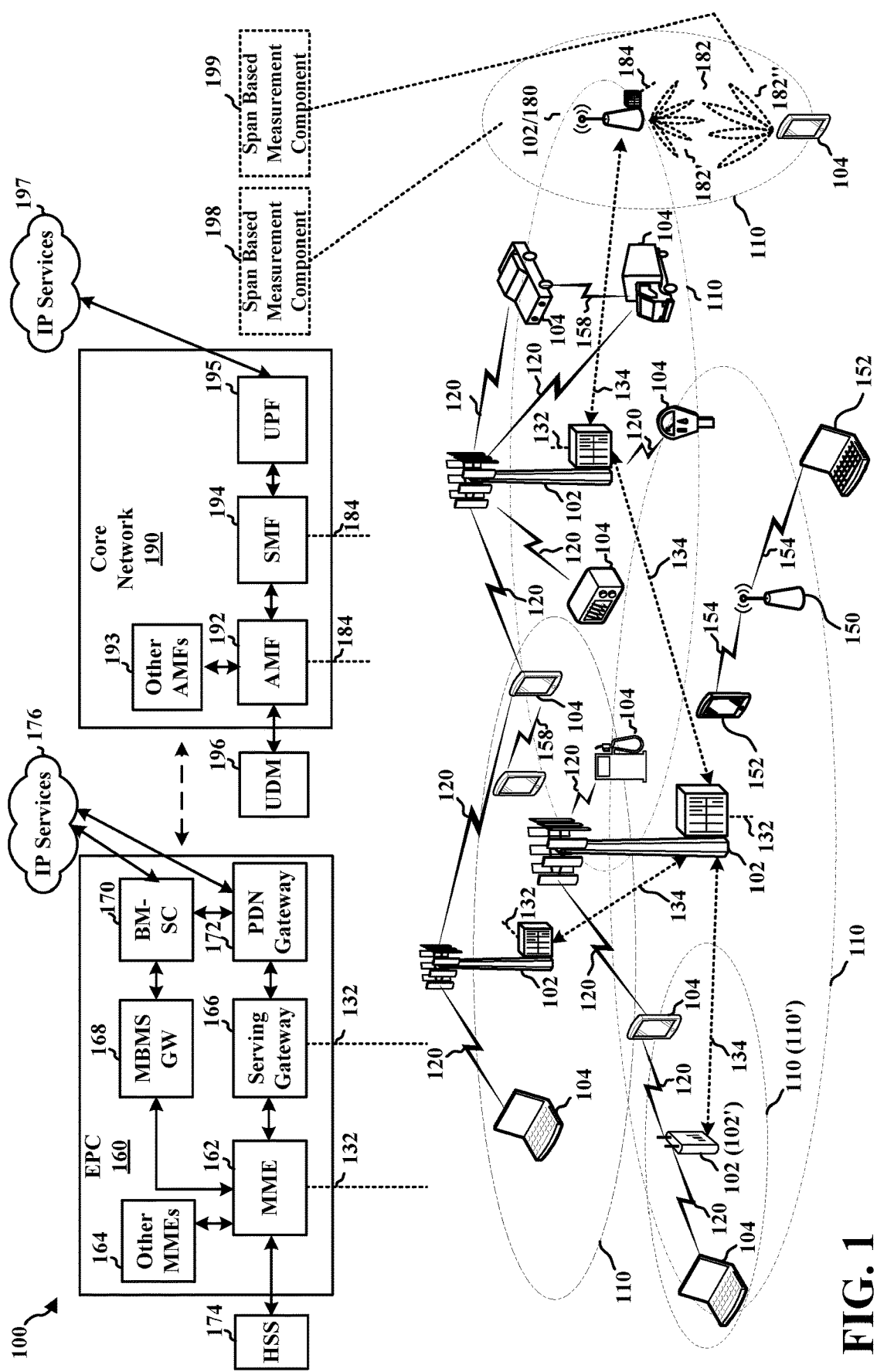
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 may include a span based measurement component 198 configured to generate a timeline based on a last symbol of a span. In certain aspects, the UE 104 may include a span based measurement component 199 configured to transmit a processing time parameter to the base station. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
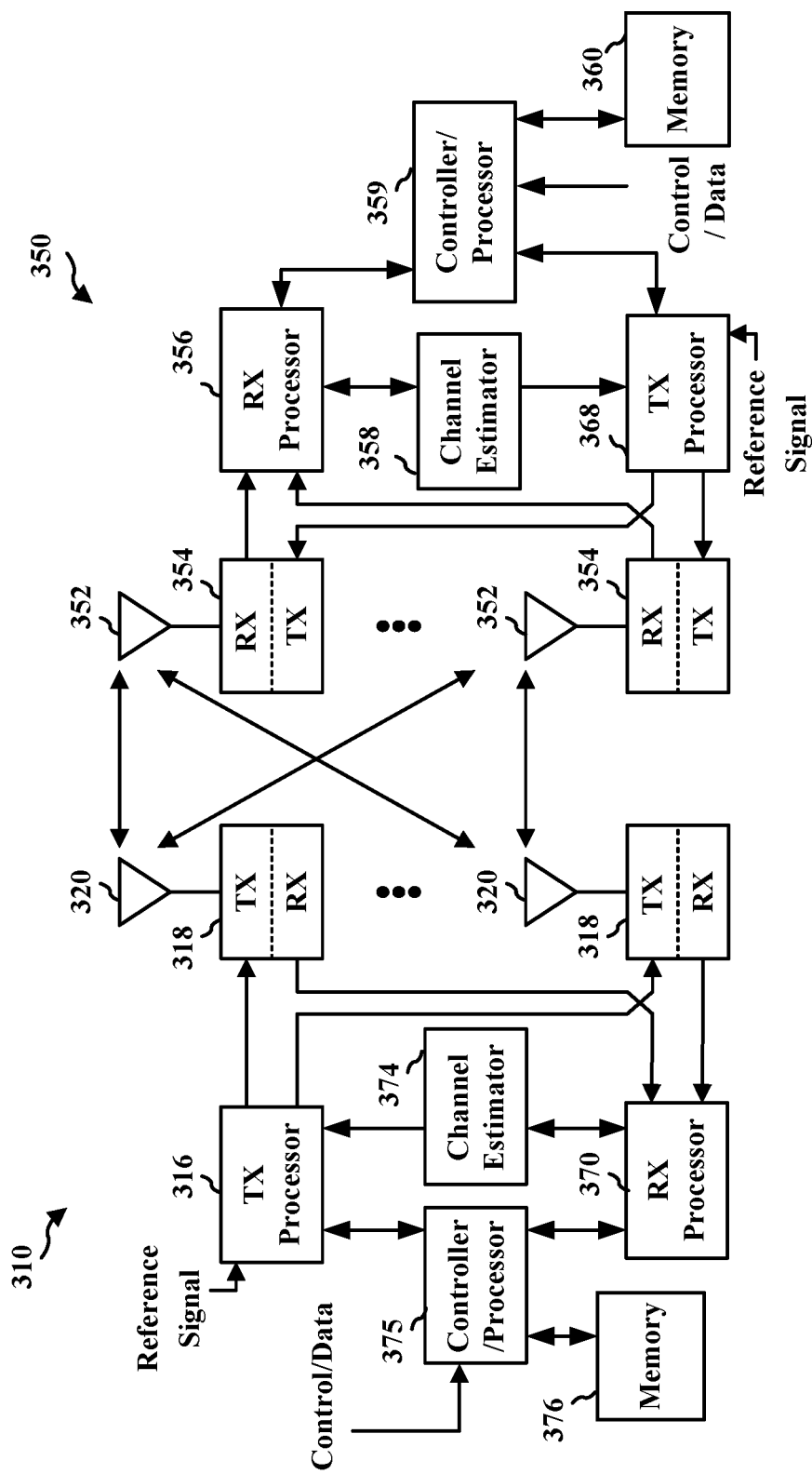
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

Figures 4A, 4B:
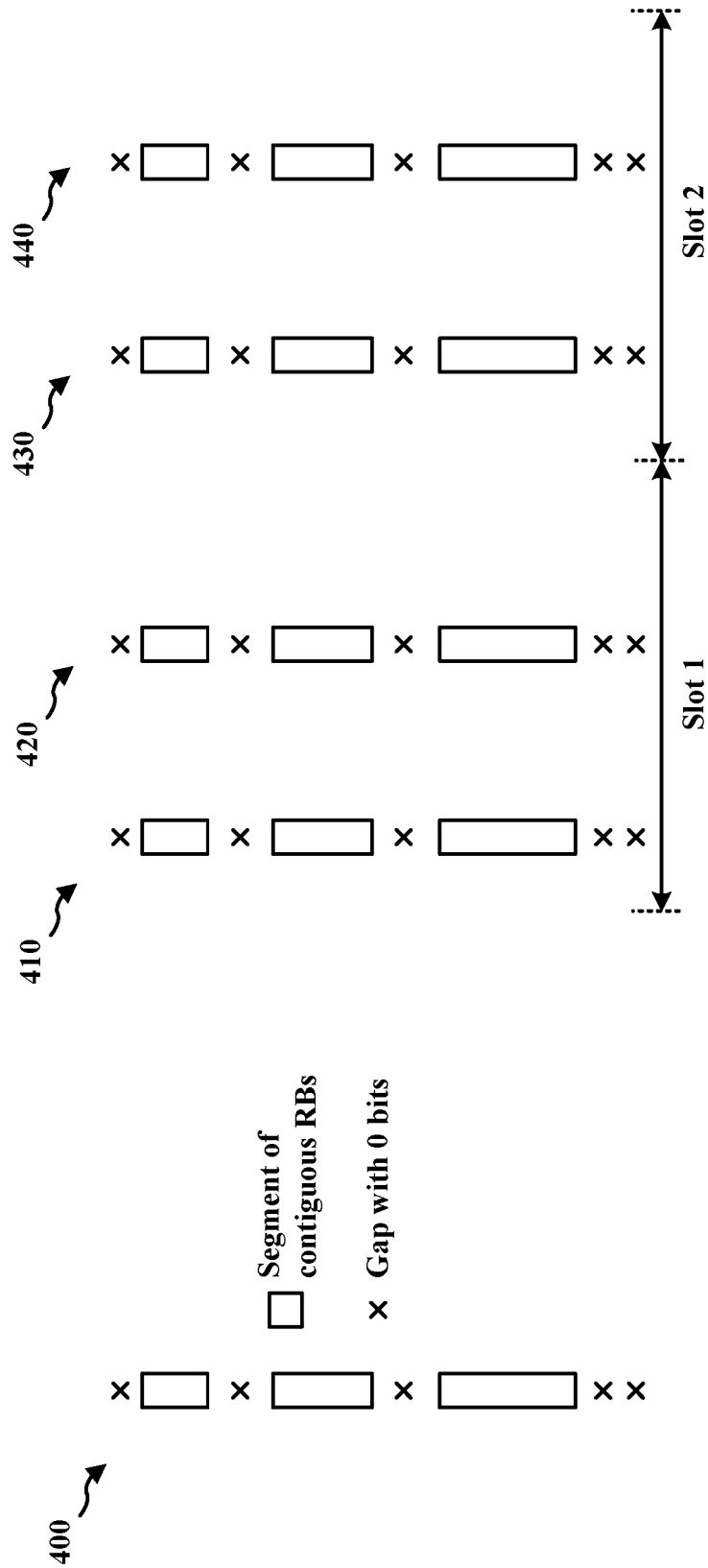
FIG. 4A is a diagram illustrating a CORSET.
FIG. 4B is a diagram illustrating a search space set.

FIG. 4A is a diagram illustrating a CORESET 400. A CORESET may be a set of frequency domain resources on which a PDCCH may be scheduled, and may have a symbol width defining the width of the CORESET. The CORESET may identify sets of contiguous RBs (e.g., sets of six contiguous RBs) in a given symbol which may receive the PDCCH and gaps which may not receive the PDCCH in the given symbol. A UE may include multiple CORESETS.

FIG. 4B is a diagram illustrating a search space set. A search space set may identify the time domain resources on which an associated CORESET is scheduled. Accordingly, together, a CORESET and a search space set may identify the resources scheduled for a PDCCH. In some aspects, a UE may be configured with three CORESETs and 10 search space sets per bandwidth part.

Each instance of a CORESET being assigned to a time domain resource may be referred to as a search space set occasion. For example, the search space set illustrated in FIG. 4B may assign the CORESET 400 illustrated in FIG. 4A to time domain resources at a first search space set occasion 410 and a second search space set occasion 420 in Slot 1, and to a third search space set occasion 430 and a fourth search space set occasion 440 in Slot 2.

FIG. 5 is a diagram 500 illustrating PDCCH scheduling options for a UE. A UE may be configured with one or more span. For example, FIG. 5 illustrates a UE having a first span 512, as second span 522, and a third span 532. A span may be a set of resources on which the UE may receive a PDCCH from a base station. The span or spans of a UE may be part of the UE feature list (e.g., may be a capability of the UE), and the UE may report it to the base station.

A UE may have two values associated with spans: a minimum gap between two spans, and a duration of a span, measured in symbols. The UE may have multiple possible pairs of the two associated values, and may select some or all of the possible pairs to report to the base station. For example, where a pair may be written as (minimum gap between two spans, duration of a span), a UE may be able to report a first option of (7, 3), (4, 3), and (2, 2), a second option of (2, 2) and (4, 3), or a third option of just (7, 3) to the base station.

For example, in FIG. 5, the UE may report to a base station that the UE is capable of receiving a PDCCH in the first span 512, the second span 522, or the third span 532. The base station may then schedule the UE to receive the PDCCH within one of the reported spans. The UE may have three PDCCH options set by configured search space sets and CORESETs: CORESET 1OS, CORESET 2OS, and CORESET 3OS.

For example, the base station may schedule the UE to receive the PDCCH during the second span 522 and the third span 532 based on CORESET 1OS, may schedule the UE to receive the PDCCH during the first span 512 and the third span 532 based on CORESET 2OS, or may schedule the UE to receive the PDCCH during the second span 522 based on CORESET 3OS.

Figure 6:
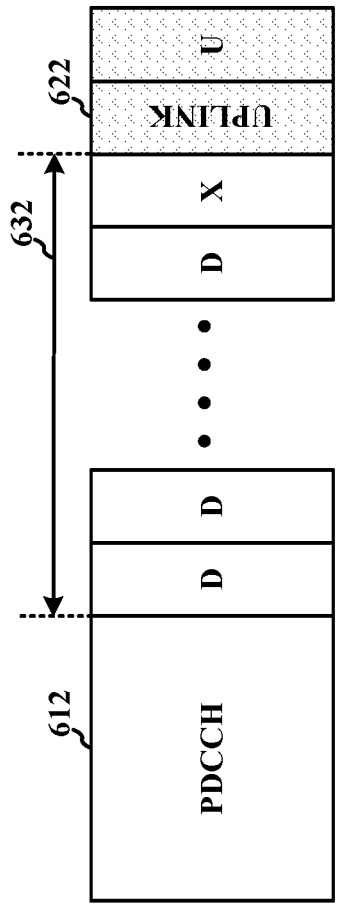
FIG. 6 is a diagram illustrating scheduling or triggering a scheduled channel based on a PDCCH.

FIG. 6 is a diagram 600 illustrating scheduling or triggering a scheduled channel based on a PDCCH. A UE may be scheduled to receive a PDCCH 612. The UE may receive information related to the scheduling of a later-scheduled channel (referred to herein as a 'scheduled channel') in the PDCCH 612. For example, as shown in FIG. 6, during the PDCCH 612, the UE may receive downlink control information scheduling an uplink channel later in the slot.

In order to transmit or receive on the scheduled channel, the UE processes the PDCCH 612 to retrieve the information related to the scheduling of the scheduled channel. The time to process the PDCCH 612 may be referred to as a processing time parameter, and may be represented as a number of symbols required to provide the processing time. The processing time parameter may depend on the processing capabilities of the UE and system configurations such as the subcarrier spacing, etc.

The processing time parameter may be the minimum number of symbols needed for the UE to process the PDCCH (or to process the portion of the PDCCH relevant to the scheduled channel. The number of symbols in the processing time parameter may be dependent on the content of the PDCCH 612 or what the PDCCH 612 is scheduling as the scheduled channel. For example, where the PDCCH 612 provides semi-persistent scheduling (SPS) PDSCH release and the UE is scheduled to provide a corresponding ACK/NACK, the processing time parameter may include a first number of symbols N. Where the PDCCH 612 provides scheduling DCI scheduling the UE to transmit a PUSCH, the processing time parameter may include a second number of symbols $N_2$. Where the PDCCH 612 provides scheduling DCI scheduling the UE to transmit a PUSCH for aperiodic CSI reporting, the processing time parameter may include a third number of symbols Z. Where PDCCH 612 provides timing control information (TCI) such as a beam switching timing threshold (e.g., timeDurationForQCL or beam-SwitchTiming) and the UE is scheduled to receive a PDSCH on the beam identified in the PUCCH, the processing time parameter may include another number of symbols.

A timeline 632 is a number of symbols between the last symbol of the PDCCH 612 and the first symbol 622 of the scheduled channel. A UE may provide a base station with one or more processing time parameter. When scheduling the PDCCH 612 and a scheduled channel, the base station utilizes the processing time parameter and schedules the scheduled channel with a timeline 632 greater than the processing time parameter, to provide the UE with time to process the PDCCH 612 prior to the first symbol 622 of the scheduled channel.

Figure 7:
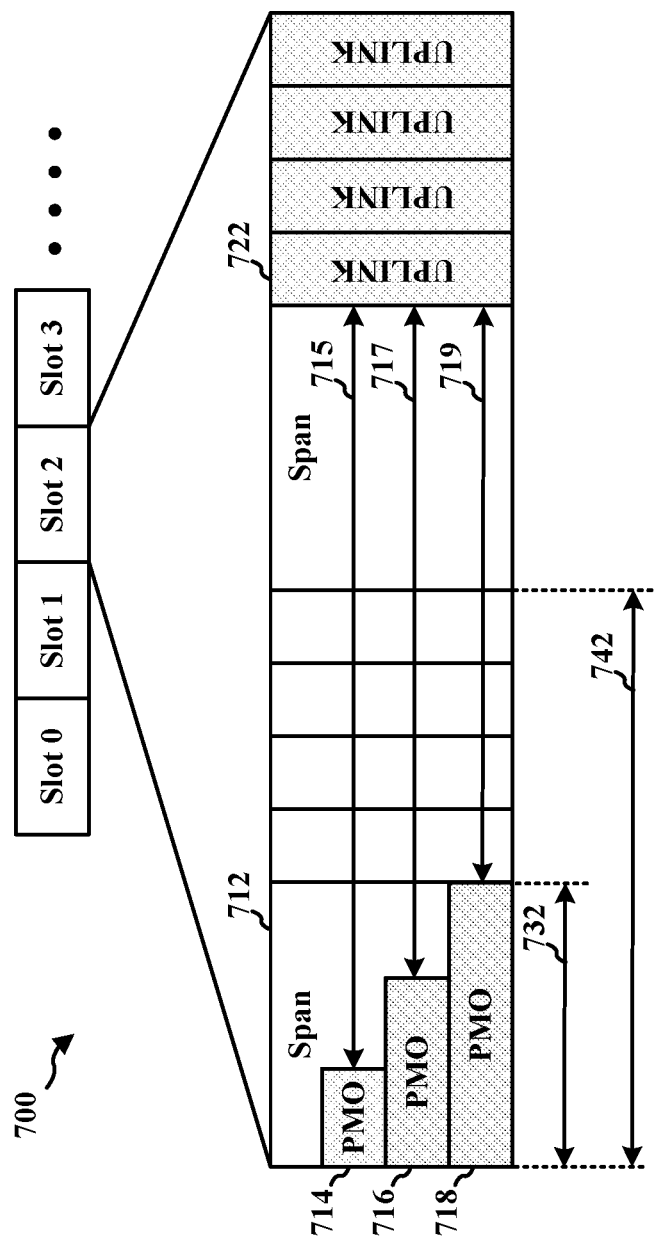
FIG. 7 is a diagram illustrating scheduling or triggering a scheduled channel using symbol based timeline measurement.

FIG. 7 is a diagram 700 illustrating scheduling or triggering a scheduled channel using PMO based timeline measurement. A base station has scheduled a UE to receive a PDCCH in a span 712 of Slot 2. As a result, the UE monitors for the PDCCH during a PDCCH monitoring occasion (PMO). The PMO corresponds to the symbols identified by the CORESET and search space set occasion where the PDCCH is scheduled to be received. For example, the span 712 may have a symbol width 732 of three symbols and a minimum space between spans 742 of seven symbols. Where the CORESET in the span 712 is one symbol wide and at the first symbol of the span 712, the UE may monitor for the PDCCH during the PMO 714. Where the CORESET in the span 712 is two symbols wide and starts at the first symbol of the span 712, the UE may monitor for the PDCCH during the PMO 716. Where the CORESET in the span 712 is three symbols wide, the UE may monitor for the PDCCH during the PMO 718.

When the UE receives the PDCCH, the PDCCH may include information for a scheduled channel. The UE may have a first processing time parameter associated with a PDCCH received in the first PMO 714 and a scheduled channel, may have a second processing time parameter associated with a PDCCH received in the second PMO 716 and a scheduled channel, and may have a third processing time parameter associated with a PDCCH received in the third PMO and a scheduled channel. The UE may have different timelines corresponding to different PMOs. The timeline for the scheduled channel for a PMO, e.g., the number of symbols between the last symbol of the PMO receiving the PDCCH and the first symbol 722 of the scheduled channel may be greater than the processing time parameter for that PMO. When scheduling the scheduled channel, the base station may determine an initial symbol for the scheduled channel which provides for the timeline for each PMO to be equal to or greater than the processing time parameter for that PMO.

For example, as shown in FIG. 7, the UE may receive a PDCCH in a span 712 which schedules an uplink channel (PUCCH or PUSCH) having a first symbol 722. Where the PDCCH has a one-symbol width and is received on the PMO 714, the UE may have a processing time parameter of nine symbols for the PDCCH. Where the PDCCH has a two-symbol width and is received on the PMO 716, the UE may have a processing time parameter of eight symbols. Where the PDCCH has a three-symbol width and is received on the PMO 718, the UE may have a processing time parameter of seven symbols. The base station may schedule the PDCCH with a first symbol 722 at the eleventh symbol of the slot, providing a first timeline 715 of nine symbols for the PDCCH of the first PMO 714, a second timeline 717 of eight symbols for the PDCCH of the second PMO 716, and a third timeline 719 of seven symbols for the PDCCH of the third PMO 718.

In some aspects, a base station may schedule a scheduled channel with a timeline based on the last symbol of a short PMO such as the first PMO 714, such that the scheduled channel would not meet the processing time parameter of a longer PMO such as the third PMO 718. The UE may process PDCCH received on the first PMO 714 and on the third PMO 718 separately. In some aspects, the UE may process the PDCCH as it is received, as the UE may need to begin processing the PDCCH prior to receiving the last symbols of the longer PMO to meet the timeline parameter of the shorter PMO.

Figure 8:
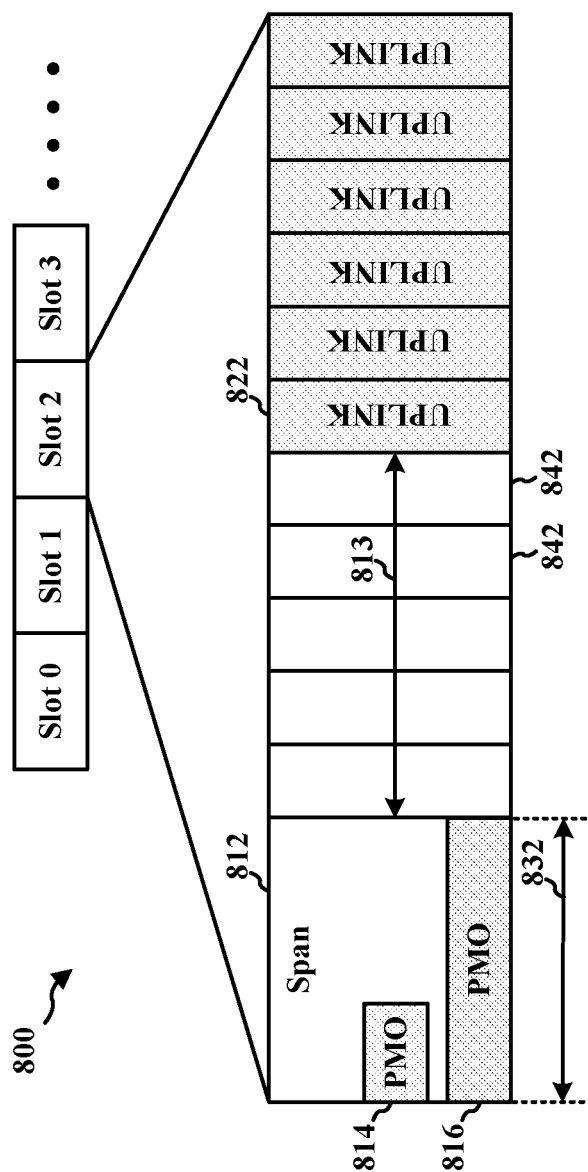
FIG. 8 is a diagram illustrating scheduling or triggering a scheduled channel using span based timeline measurement.

FIG. 8 is a diagram 800 illustrating scheduling or triggering a scheduled channel using span based timeline measurement. A base station has scheduled a UE to receive a PDCCH in a span 812 in Slot 2. As a result, the UE monitors for the PDCCH during a PMO in the span 812, on symbols identified by the CORESET and search space set occasion. The symbol width 832 of the span 812 may be three symbols. Where the CORESET in the span 812 is one symbol wide and at the first symbol of the span 812, the UE may monitor for the PDCCH during the PMO 814. Where the CORESET in the span 812 is three symbols wide, the UE may monitor for the PDCCH during the PMO 816.

When the UE receives the PDCCH, the PDCCH may include information for a scheduled channel. The UE may have a processing time parameter associated with the PDCCH and the scheduled channel. The base station may schedule the scheduled channel with a timeline 813 based on the last symbol of the span 812. The timeline 813 may be equal to or greater than the processing time parameter of the UE associated with the PDCCH, and may be measured from the last symbol of the span 812. Accordingly, the timeline 813 may provide time for the UE to process the PUCCH prior to transmitting or receiving on the first symbol 822 of the scheduled channel, regardless of whether the PUCCH is received in the first PMO 814 or the second PMO 816.

For example, the processing time parameter for the UE may be five symbols, the span symbol width 832 may be three symbols, the first PMO 814 may be one symbol long, and the second PMO 816 may be three symbols long. The base station may schedule the scheduled channel such that the first symbol 822 of the scheduled channel is at the ninth symbol of the slot or later—at least five symbols after the last symbol of the span 812. If the PDCCH is received on the first PMO 814, the UE has at least seven symbols to process the PDCCH, which is greater than the processing time parameter. If the PDCCH is received on the second PMO 816, the UE has at least five symbols to process the PDCCH, which is equal to or greater than the processing time parameter.

In some aspects, where the PDCCH was received on the PMO 814, and where the PMO 814 is two symbols shorter than the symbol width 832 of the span, the UE may ignore the last two symbols 842 before the first symbol 822 of the scheduled channel and the base station may not transmit on the last two symbols 842.

In some aspects, the UE may receive PDCCH scheduling a scheduled channel on multiple search space set occasions (e.g., on multiple PMOs) in a single span. The UE may process the PDCCH received on each search space set occasion together. As the timeline 813 provides for the processing time parameter regardless of the PMO, the UE may receive the PDCCH on each search space set occasion with enough time to process the PDCCH prior to the first symbol 822 of the scheduled channel.

Figure 9:
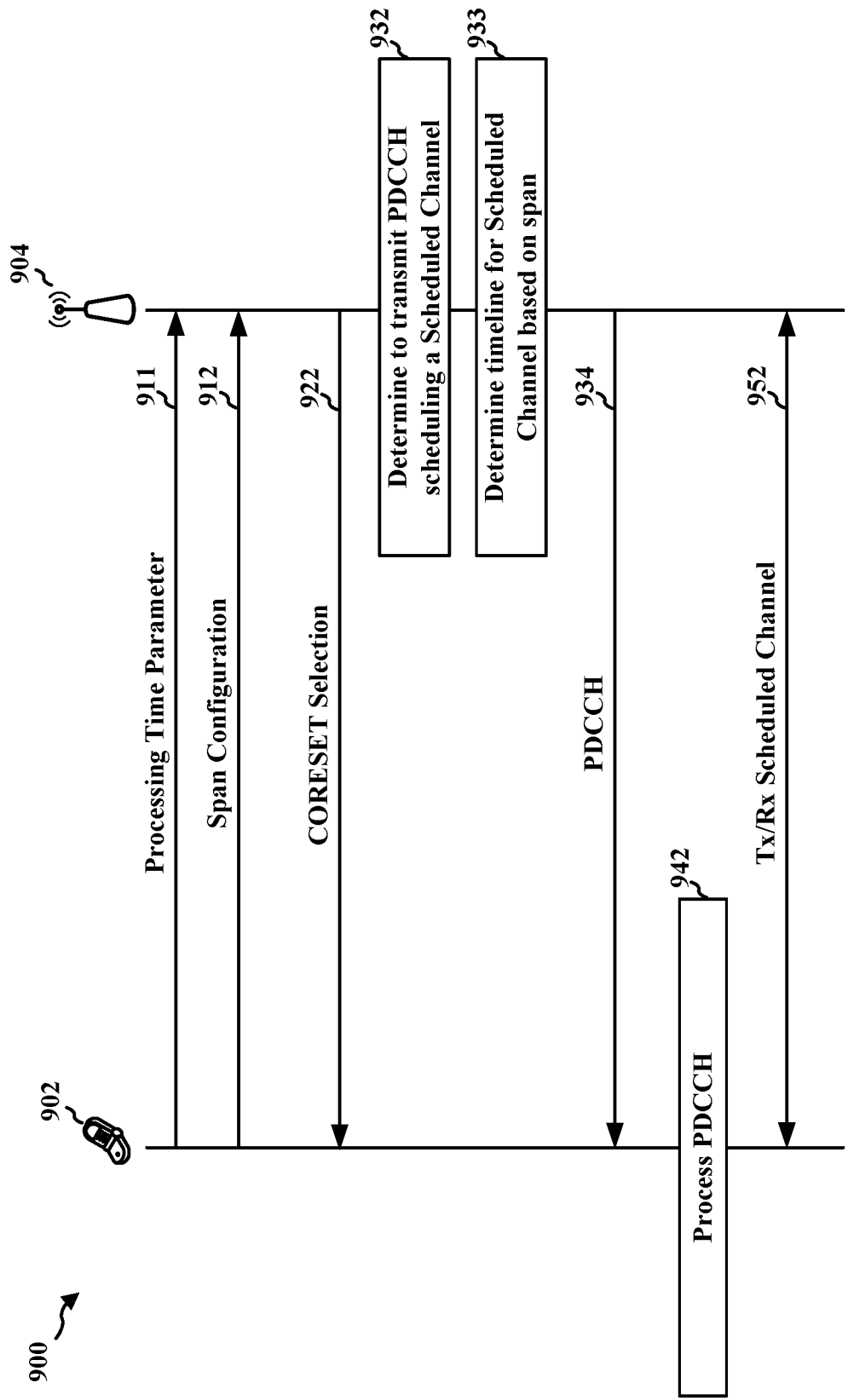
FIG. 9 is a communication flow diagram illustrating scheduling or triggering a scheduled channel using span based timeline measurement.

FIG. 9 is a communication flow diagram 900 illustrating scheduling or triggering a scheduled channel using span based timeline measurement. A UE 902 may transmit a processing time parameter 911 to a base station 904, and the base station 904 may receive the processing time parameter 911. The processing time parameter may identify a number of symbols for the UE to process a PDCCH. In some aspects, the processing time parameter 911 includes multiple processing time parameters associated with different types of scheduled channels and different configurations (e.g., SCS).

The UE 902 may transmit a span configuration 912 to the base station 904, and the base station 904 may receive the span configuration 912. The span configuration 912 may include the minimum gap between two spans and the duration of the span. The span configuration 912 may identify the symbols where the span will be located. In some aspects, the span configuration 912 may include multiple possible pairs of associated values of the minimum gap between two spans and the duration of the span.

The base station 904 may determine the resources that will be used for the CORESET where the PDCCH may be transmitted and may transmit a CORESET selection 922 to the UE 902, and the UE 902 may receive the CORESET selection 922. The CORESET selection 922 may include one or more CORESET and one or more search space set to define the resources on which the PDCCH will be transmitted. The base station 904 may configure the CORESETs to be on a search space set occasion within a corresponding span of the UE.

As illustrated at 932, the base station 904 may determine to transmit a PDCCH that schedules or triggers a scheduled channel. For example, the base station 904 may determine to transmit a PDCCH with an uplink grant that schedules an uplink channel such as a PUCCH or a PUSCH. The base station 904 may determine to transmit the PDCCH that schedules or triggers the scheduled channel on the resources configured by the CORESET selection 922, during the corresponding span of the UE 902.

As illustrated at 933, the base station 904 may determine a timeline for the scheduled channel based on the span in which the PDCCH scheduling the scheduled channel will be transmitted. The base station 904 may determine the timeline to be the number of symbols between the last symbol of the corresponding span of the UE 902 and the first symbol of the scheduled channel, based on the processing time parameter 911. The base station 904 may transmit the PDCCH 934, including the DCI scheduling the scheduled channel with a timeline based on last symbol of the span, to the UE 902 during the span and the UE 902 may receive the PDCCH 934 during a PMO in the span. In some aspects, the base station 904 may transmit PDCCH 934 to the UE 902 on multiple search space set occasions in a single span.

As illustrated at 942, the UE 902 may process the PDCCH. For example, the UE 902 may process the PDCCH to determine that it includes DCI scheduling the scheduled channel and/or to determine when the DCI indicates the scheduled channel is scheduled. In some aspects, the UE 902 may process PDCCH received on multiple search space set occasions in a single span together (e.g., may process the PDCCH at the same time, may process the PDCCH once all PDCCH has been received, or may process the PDCCH after the end of the span).

As illustrated at 952, the UE 902 and the base station 904 may transmit/receive the scheduled channel 952 on the scheduled resources. For example, where the scheduled channel 952 is an uplink channel such as a PUCCH or a PUSCH, the UE 902 may transmit the scheduled channel 952 at the schedule resources and the base station 904 may receive the scheduled channel 952 at the scheduled resources. Where the scheduled channel 952 is a downlink channel such as a PDSCH channel, the base station 904 may transmit the scheduled channel 952 at the scheduled resources and the UE 902 may receive the scheduled channel 952 at the scheduled resources.

Figure 10:
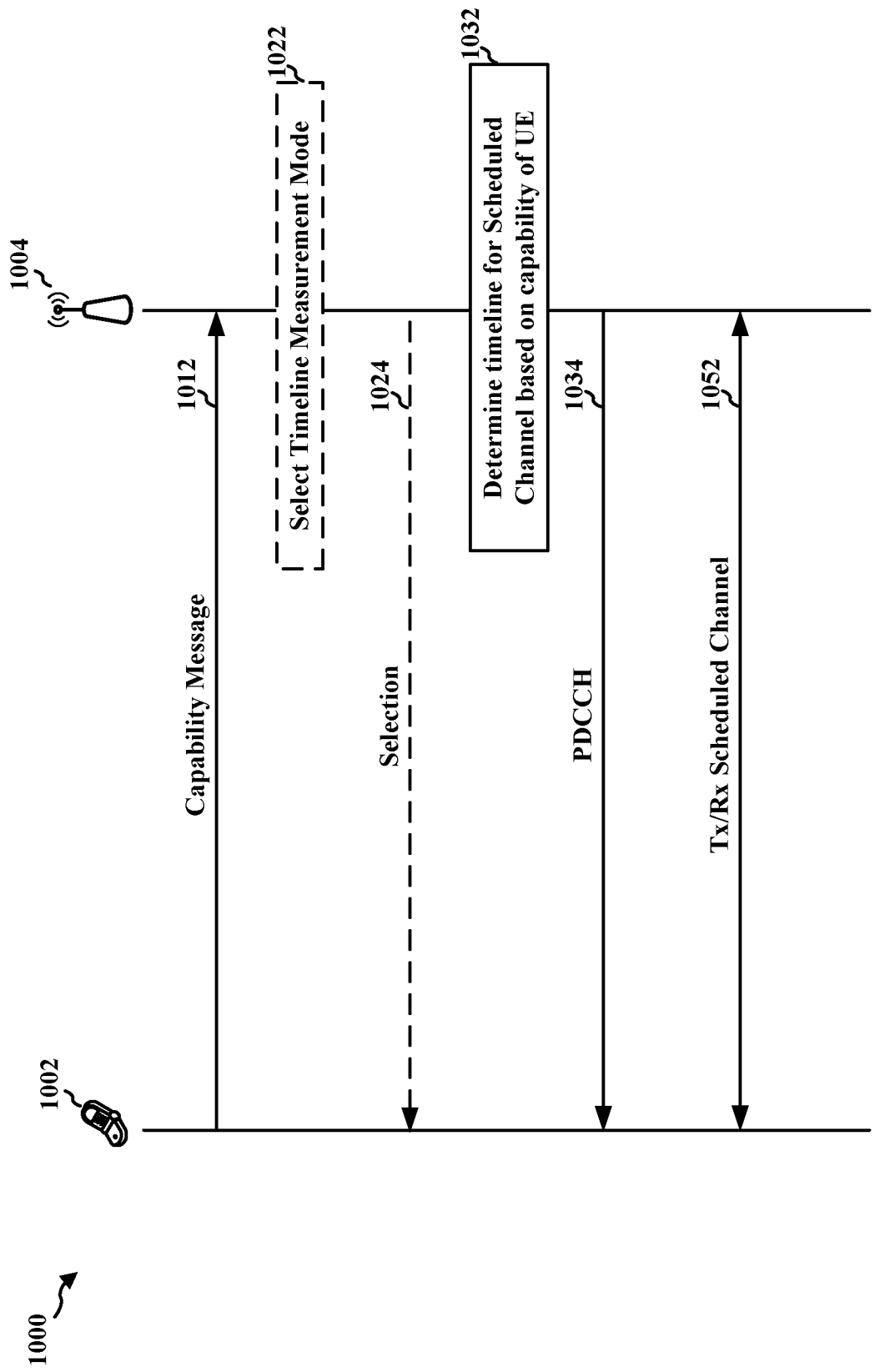
FIG. 10 is a communication flow diagram illustrating a UE communicating timeline measurement capabilities to a base station.

FIG. 10 is a communication flow diagram 1000 illustrating a UE 1002 communicating timeline measurement capabilities to a base station 1004. The UE 1002 may transmit a capability message 1012 to the base station 1004, and the base station 1004 may receive the capability message 1012. The capability message may indicate the UE's support for PMO based timeline measurement (e.g., measuring a timeline based on the symbols of the PDCCH, as discussed in connection with FIG. 7) and span based timeline measurement (e.g., measuring a timeline based on the span as discussed in connection with FIG. 8). The capability message 1012 may indicate that the UE 1002 only supports PMO based timeline measurement, only supports span based timeline measurement, or supports both PMO and span based timeline measurement.

In some aspects, such as where the UE 1002 supports both PMO and span based timeline measurement and indicates as much in the capability message 1012, the base station 1004 may determine whether to use PMO or span based timeline measurement for scheduling with the UE 1002, as illustrated at 1022. The base station 1004 may transmit a selection 1024 to the UE 1002 identifying which timeline measurement mode was selected, and the UE 1002 may receive the selection 1024 to determine which timeline measurement mode to use. The selection 1024 may be in a media access control control element (MAC-CE), an RRC message, or PDCCH DCI.

As illustrated at 1032, the base station 1004 may determine a timeline for a scheduled channel based on the capability message 1012. The base station 1004 may have determined to transmit a PDCCH scheduling the scheduled channel in a PMO in a span of the UE 1002. If the capability message indicated that the UE 1002 only supported PMO based timeline measurement, the base station 1004 may select resources for the scheduled channel based on a processing time parameter and the last symbol of the PDCCH, to provide for a timeline between the last symbol of the PDCCH and the first symbol of the scheduled channel to be greater than the processing time parameter. If the capability message indicated that the UE 1002 only supported span based timeline measurement, the base station 1004 may select resources for the scheduled channel based on a processing time parameter and the last symbol of the span, to provide for a timeline between the last symbol of the span and the first symbol of the scheduled channel to be greater than the processing time parameter. If the capability message indicated that the UE 1002 supported both PMO and span based timeline measurement, the base station 1004 may generate the timeline based on the selection made as illustrated at 1022.

The base station 1004 may transmit the PDCCH 1034 to the UE 1002, on resources selected based on PMO or span based timeline measurement as illustrated at 1032. The UE 1002 may receive the PDCCH 1034 during a PMO in a span of the UE 1002.

At 1052, the UE 1002 and the base station 1004 may transmit/receive the scheduled channel 1052, on the resources selected for the scheduled channel identified at 1032. For example, where the scheduled channel 1052 is an uplink channel such as a PUCCH or a PUSCH, the UE 1002 may transmit the scheduled channel 1052 on the selected resources and the base station 1004 may receive the scheduled channel 1052 on the selected resources. Where the scheduled channel 1052 is a downlink channel such as a PDSCH channel, the base station 1004 may transmit the scheduled channel 1052 on the selected resources and the UE 1002 may receive the scheduled channel 1052 on the selected resources.

Figure 11:
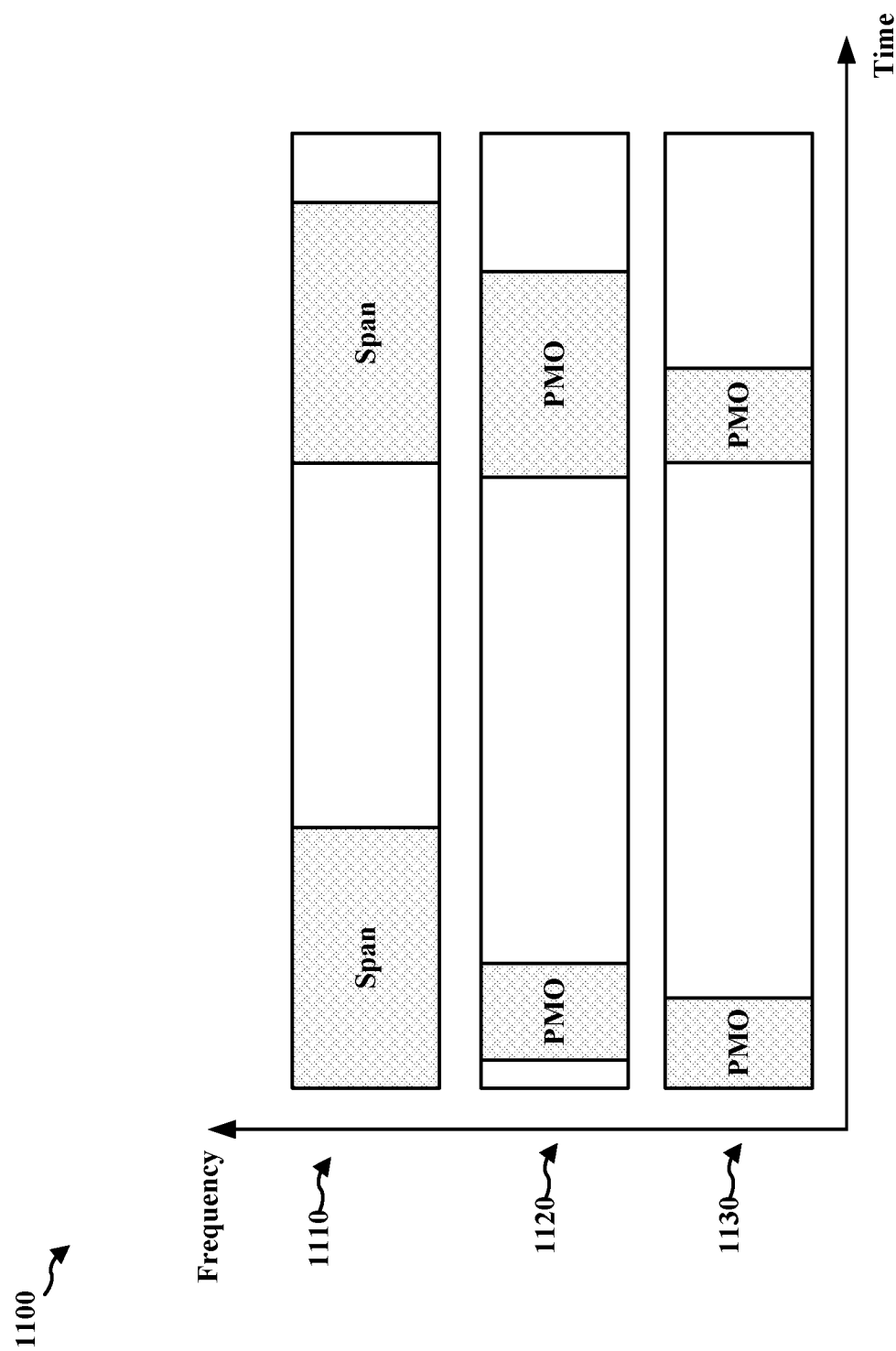
FIG. 11 is a diagram illustrating bandwidth part dependent timeline measurement configuration.

FIG. 11 is a diagram 1100 illustrating bandwidth part (BWP) dependent timeline measurement configuration. A UE may communication with one or more base station on a first BWP 1110, a second BWP 1120, or a third BWP 1130. The UE may include one or more timeline measurement indicator, and the timeline measurement indicator may indicate whether the UE is configured to use only PMO based timeline measurement, only span based timeline measurement, or both PMO and span based timeline measurement for transmissions on an associated BWP. For example, the UE may include a timeline measurement indicator indicating that the UE is configured to utilize span based timeline measurement for communications on the first BWP 1110, and may include timeline measurement indicators indicating that the UE is configured to utilize PMO based timeline measurement for communications on the second BWP 1120 and the third BWP 1130.

A timeline measurement indicator may be configured in a MAC-CE, an RCC message, or PDCCH DCI.

In some aspects, all BWPs that the UE communicates on are associated with the same timeline measurement indicator. In some aspects, each BWP is associated with a distinct timeline measurement indicator.

In some aspects, the UE may utilize span based timeline measurement on an initial or default BWP and may utilize PMO based timeline measurement on other BWPs.

In some aspects, the UE may utilize span based timeline measurement on an initial or default BWP and may utilize PMO or span based timeline measurement on other BWPs. The other BWPs may all be associated with a single timeline measurement indicator to identify whether the UE should use PMO or span based timeline measurement for communications on those BWPs. Alternatively, the other BWPs may include separate timeline measurement indicators and may be configured individually.

Figure 12:
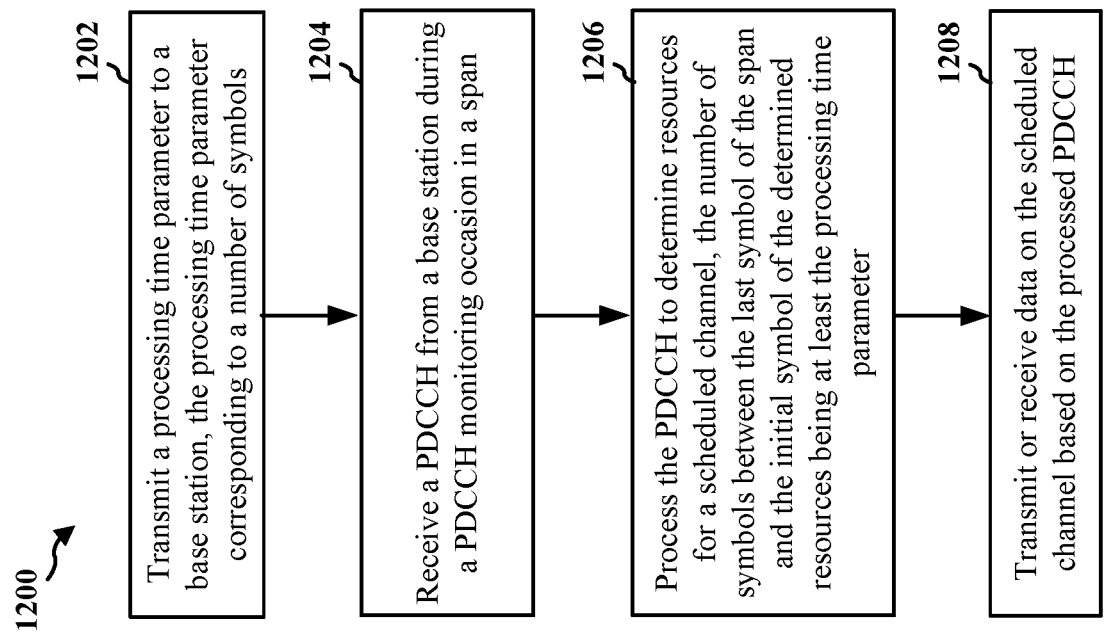
FIG. 12 is a flowchart of a method of wireless communication.

FIG. 12 is a flowchart 1200 of a method of wireless communication. The method may be performed by a UE (e.g., the UE 350, 902, 1002, which may include the memory 360 and which may be the entire UE or a component of the UE, such as the TX processor 368, the RX processor 356, and/or the controller/processor 359).

At 1202, the UE transmits a processing time parameter to a base station, the processing time parameter corresponding to a number of symbols.

At 1204, the UE receives a PDCCH from a base station during a PDCCH monitoring occasion in a span. A last symbol of the PDCCH monitoring occasion may be before the last symbol of the span. The last symbol of the PDCCH monitoring occasion may be X symbols before the last symbol of the span and the data may be transmitted on an N+Xth symbol after the last symbol of the PDCCH monitoring occasion.

At 1206, the UE processes the PDCCH received in the PDCCH monitoring occasion to determine resources for a scheduled channel, a number of symbols between a last symbol of the span and an initial symbol of the determined resources being equal to or greater than the number of symbols of the processing time parameter. The receiving the PDCCH from the base station during the PDCCH monitoring occasion in the span may include receiving the PDCCH during a plurality of PDCCH monitoring occasions in the span, and the processing the PDCCH may include processing the PDCCH received in each PDCCH monitoring occasion of the plurality of PDCCH monitoring occasions together.

At 1208, the UE transmits or receives data on the scheduled channel based on the processed PDCCH. The processing time parameter may correspond to a minimum number of symbols to provide time for the UE to process the PDCCH. The processing time parameter may be a minimum processing time of the UE for processing the PDCCH, and the minimum processing time may include at least a minimum preparation time of the corresponding scheduled channel.

In some aspects, the UE may transmit a capability message to the base station, the capability message indicating support for PMO based timeline measurement, span based timeline measurement, or PMO and span based timeline measurement, wherein the determined resources are based on the capability message. The capability message may indicate support for PMO and span based timeline measurement, and the UE may receive a selection from the base station, the selection indicating PMO based timeline measurement or span based timeline measurement. The selection may indicate span based timeline measurement and the initial symbol of the determined resources may be based on the selection. The selection may be received in a media access control control element, a radio resource control message, or a PDCCH downlink control information. The capability message may indicate support for symbol and span based timeline measurement, and the initial symbol of the determined resources may be based on receiving no selection from the base station in response to the capability message.

In some aspects, the UE may receive a plurality of transmissions on a plurality of bandwidth parts (BWPs). The UE may include a timeline measurement indicator for each BWP of the plurality of BWPs, wherein each timeline measurement indicator indicates support for span based timeline measurement, PMO based timeline measurement, or both span and PMO based timeline measurement for the corresponding BWP. The PDCCH may be received on an initial BWP of the plurality of BWPs, and the timeline measurement indicator for the initial BWP may indicate support for span based timeline measurement. The timeline measurement indicators of the plurality of BWPs other than the initial BWP may indicate support for PMO based timeline measurement. The timeline measurement indicators of the plurality of BWPs other than the initial BWP may indicate support for span and PMO based timeline measurement.

Figure 13:
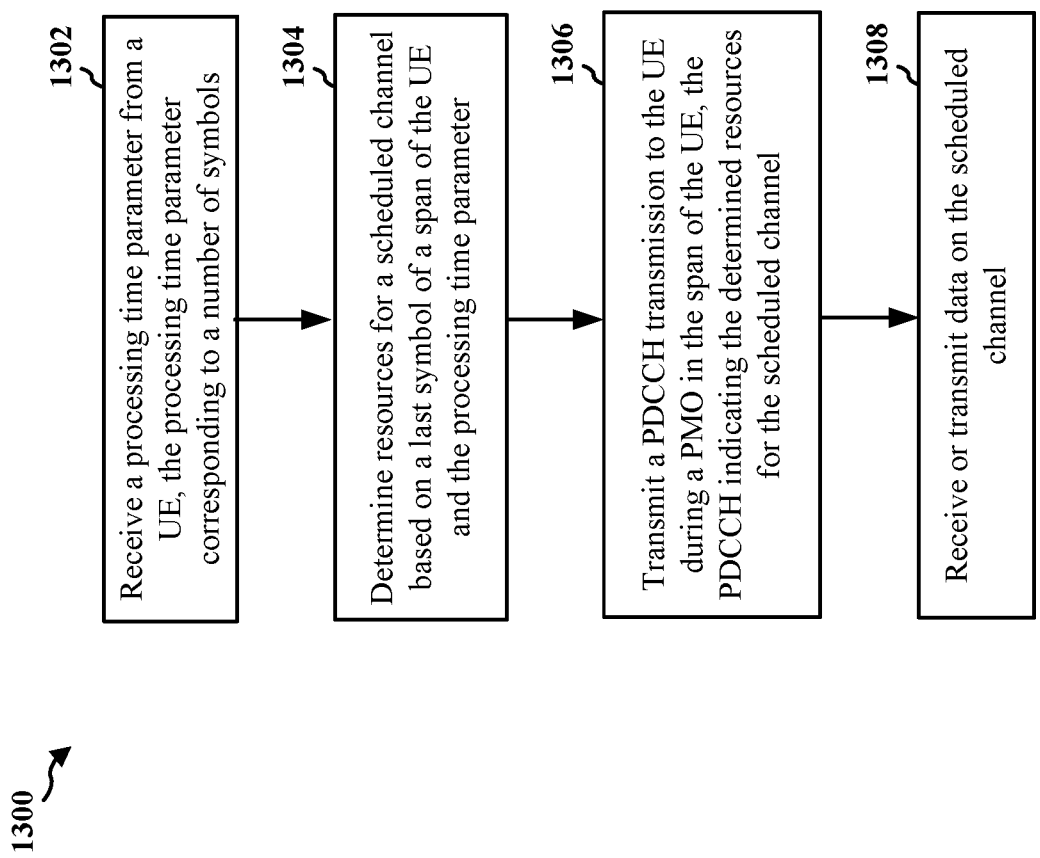
FIG. 13 is a flowchart of a method of wireless communication.

FIG. 13 is a flowchart 1300 of a method of wireless communication. The method may be performed by a base station (e.g., the base station 310, 904, 1004, which may include the memory 376 and which may be the entire base station or a component of the base station, such as the TX processor 316, the RX processor 370, and/or the controller/processor 375).

At 1302, the base station receives a processing time parameter from a UE, the processing time parameter corresponding to a number of symbols.

At 1304, the base station determines resources for a scheduled channel based on a last symbol of a span of the UE and the processing time parameter. The number of symbols between the last symbol of the span and the initial symbol of the determined resources may be equal to or greater than the number of symbols of the processing time parameter.

At 1306, the base station transmits a PDCCH transmission to the UE during a PDCCH monitoring occasion in the span of the UE, the PDCCH indicating the determined resources for the scheduled channel. The processing time parameter may correspond to a minimum number of symbols to provide time for the UE to process the PDCCH. The processing time parameter may be a minimum processing time of the UE for processing the PDCCH, and the minimum processing time may include at least a minimum preparation time of the corresponding scheduled channel. A last symbol of the PDCCH monitoring occasion may be before the last symbol of the span. The last symbol of the PDCCH monitoring occasion may be X symbols before the last symbol of the span and the data may be transmitted on an N+Xth symbol after the last symbol of the PDCCH monitoring occasion.

At 1308, the base station receives or transmits data on the scheduled channel.

In some aspects, the base station may receive a capability message from the UE, the capability message indicating support for PMO based timeline measurement, span based timeline measurement, or PMO and span based timeline measurement, and the determined resources may be based on the capability message. The capability message may indicate support for PMO and span based timeline measurement, and the base station may transmit a selection to the UE, the selection indicating PMO based timeline measurement or span based timeline measurement. The selection may indicate span based timeline measurement and the determined resources may be based on the selection. The selection may be transmitted in a media access control control element, a radio resource control message, or a PDCCH downlink control information.

In some aspects, the base station may transmit a plurality of transmissions to the UE on a plurality of BWPs, and may receive a timeline measurement indicator for each BWP of the plurality of BWPs from the UE. Each timeline measurement indicator may indicate support for span based timeline measurement, PMO based timeline measurement, or both span and PMObased timeline measurement for the corresponding BWP. The PDCCH may be transmitted on an initial BWP of the plurality of BWPs, and the timeline measurement indicator for the initial BWP may indicate support for span based timeline measurement. The timeline measurement indicators of the plurality of BWPs other than the initial BWP may indicate support for PMO based timeline measurement. The timeline measurement indicators of the plurality of BWPs other than the initial BWP may indicate support for span and symbol based timeline measurement.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE) comprising:
    transmitting a processing time parameter to a base station, the processing time parameter corresponding to a number of symbols;
    receiving a physical downlink control channel (PDCCH) from a base station during a PDCCH monitoring occasion (PMO) in a span;
    processing the PDCCH received in the PDCCH monitoring occasion to determine resources for a scheduled channel, a number of symbols between a last symbol of the span and an initial symbol of the determined resources being equal to or greater than the number of symbols of the processing time parameter; and
    transmitting or receiving data on the scheduled channel based on the processed PDCCH.

2. The method of claim 1, wherein the processing time parameter corresponds to a minimum number of symbols to provide time for the UE to process the PDCCH, or a minimum processing time of the UE for processing the PDCCH, and wherein the minimum processing time includes at least a minimum preparation time of the corresponding scheduled channel.

3. The method of claim 1, wherein a last symbol of the PMO is before the last symbol of the span, or X symbols before the last symbol of the span and the data is transmitted on an N+Xth symbol after the last symbol of the PMO.

4. The method of claim 1, further comprising:
    transmitting a capability message to the base station, the capability message indicating support for PMO based timeline measurement, span based timeline measurement, or PMO and span based timeline measurement, wherein the determined resources are based on the capability message.

5. The method of claim 4, wherein the capability message indicates support for PMO and span based timeline measurement, the method further comprising:
    receiving a selection from the base station, the selection indicating PMO based timeline measurement or span based timeline measurement.

6. The method of claim 5, wherein the selection indicates span based timeline measurement and the initial symbol of the determined resources is based on the selection.

7. The method of claim 4, wherein the capability message indicates support for PMO and span based timeline measurement, and wherein the initial symbol of the determined resources is based on receiving no selection from the base station in response to the capability message.

8. The method of claim 1, further comprising:
receiving a plurality of transmissions on a plurality of bandwidth parts (BWPs), the UE comprising a timeline measurement indicator for each BWP of the plurality of BWPs, wherein each timeline measurement indicator indicates support for span based timeline measurement, PMO based timeline measurement, or both span and PMO based timeline measurement for the corresponding BWP.

9. The method of claim 8, wherein the PDCCH is received on an initial BWP of the plurality of BWPs, and wherein the timeline measurement indicator for the initial BWP indicates support for span based timeline measurement, or wherein the timeline measurement indicators of the plurality of BWPs other than the initial BWP indicate support for at least one of a PMO based timeline measurement or a span and PMO based timeline measurement.

10. The method of claim 1, wherein the receiving the PDCCH from the base station during the PDCCH monitoring occasion in the span comprises receiving the PDCCH during a plurality of PDCCH monitoring occasions in the span, and the processing the PDCCH comprises processing the PDCCH received in each PDCCH monitoring occasion of the plurality of PDCCH monitoring occasions together.

11. A method of wireless communication at a base station comprising:
receiving a processing time parameter from a user equipment (UE), the processing time parameter corresponding to a number of symbols;
determining resources for a scheduled channel based on a last symbol of a span of the UE and the processing time parameter;
transmitting a physical downlink control channel (PDCCH) transmission to the UE during a PDCCH monitoring occasion (PMO) in the span of the UE, the PDCCH indicating the determined resources for the scheduled channel; and
receiving or transmitting data on the scheduled channel.

12. The method of claim 11, wherein the processing time parameter corresponds to a minimum number of symbols to provide time for the UE to process the PDCCH, or a minimum processing time of the UE for processing the PDCCH, and wherein the minimum processing time includes at least a minimum preparation time of the corresponding scheduled channel.

13. The method of claim 11, wherein a last symbol of the PDCCH monitoring occasion is before the last symbol of the span, or X symbols before the last symbol of the span and the data is transmitted on an N+Xth symbol after the last symbol of the PDCCH monitoring occasion.

14. The method of claim 11, further comprising:
receiving a capability message from the UE, the capability message indicating support for PMO based timeline measurement, span based timeline measurement, or PMO and span based timeline measurement, wherein the determined resources are based on the capability message.

15. The method of claim 14, wherein the capability message indicates support for PMO and span based timeline measurement, the method further comprising:
transmitting a selection to the UE, the selection indicating PMO based timeline measurement or span based timeline measurement.

16. An apparatus for wireless communication at a user equipment (UE), comprising:
a memory; and
at least one processor coupled to the memory and configured to:
transmit a processing time parameter to a base station, the processing time parameter corresponding to a number of symbols;
receive a physical downlink control channel (PDCCH) from a base station during a PDCCH monitoring occasion (PMO) in a span;
process the PDCCH received in the PDCCH monitoring occasion to determine resources for a scheduled channel, a number of symbols between a last symbol of the span and an initial symbol of the determined resources being equal to or greater than the number of symbols of the processing time parameter; and
transmit or receive data on the scheduled channel based on the processed PDCCH.

17. The apparatus of claim 16, wherein the processing time parameter corresponds to a minimum number of symbols to provide time for the UE to process the PDCCH, or a minimum processing time of the UE for processing the PDCCH, and wherein the minimum processing time includes at least a minimum preparation time of the corresponding scheduled channel.

18. The apparatus of claim 16, wherein a last symbol of the PMO is before the last symbol of the span, or X symbols before the last symbol of the span and the data is transmitted on an N+Xth symbol after the last symbol of the PMO.

19. The apparatus of claim 16, wherein the processor is further configured to:
transmit a capability message to the base station, the capability message indicating support for PMO based timeline measurement, span based timeline measurement, or PMO and span based timeline measurement, wherein the determined resources are based on the capability message.

20. The apparatus of claim 19, wherein the capability message indicates support for PMO and span based timeline measurement, and wherein the processor is further configured to:
receive a selection from the base station, the selection indicating PMO based timeline measurement or span based timeline measurement.

21. The apparatus of claim 20, wherein the selection indicates span based timeline measurement and the initial symbol of the determined resources is based on the selection.

22. The apparatus of claim 19, wherein the capability message indicates support for PMO and span based timeline measurement, and wherein the initial symbol of the determined resources is based on receiving no selection from the base station in response to the capability message.

23. The apparatus of claim 16, wherein the processor is further configured to:
receive a plurality of transmissions on a plurality of bandwidth parts (BWPs), the UE comprising a timeline measurement indicator for each BWP of the plurality of BWPs, wherein each timeline measurement indicator indicates support for span based timeline measurement, PMO based timeline measurement, or both span and PMO based timeline measurement for the corresponding BWP.

24. The apparatus of claim 23, wherein the PDCCH is received on an initial BWP of the plurality of BWPs, and wherein the timeline measurement indicator for the initial BWP indicates support for span based timeline measurement, or wherein the timeline measurement indicators of the plurality of BWPs other than the initial BWP indicate support for at least one of a PMO based timeline measurement or a span and PMO based timeline measurement.

25. The apparatus of claim 16, wherein the receiving the PDCCH from the base station during the PDCCH monitoring occasion in the span comprises receiving the PDCCH during a plurality of PDCCH monitoring occasions in the span, and the processing the PDCCH comprises processing the PDCCH received in each PDCCH monitoring occasion of the plurality of PDCCH monitoring occasions together.

26. An apparatus for wireless communication at a base station, comprising:
a memory; and
at least one processor coupled to the memory and configured to:
receive a processing time parameter from a user equipment (UE), the processing time parameter corresponding to a number of symbols;
determine resources for a scheduled channel based on a last symbol of a span of the UE and the processing time parameter;
transmit a physical downlink control channel (PDCCH) transmission to the UE during a PDCCH monitoring occasion (PMO) in the span of the UE, the PDCCH indicating the determined resources for the scheduled channel; and
receive or transmit data on the scheduled channel.

27. The apparatus of claim 26, wherein the processing time parameter corresponds to a minimum number of symbols to provide time for the UE to process the PDCCH, or a minimum processing time of the UE for processing the PDCCH, and wherein the minimum processing time includes at least a minimum preparation time of the corresponding scheduled channel.

28. The apparatus of claim 26, wherein a last symbol of the PDCCH monitoring occasion is before the last symbol of the span, or X symbols before the last symbol of the span and the data is transmitted on an N+Xth symbol after the last symbol of the PDCCH monitoring occasion.

29. The apparatus of claim 26, wherein the processor is further configured to:
receive a capability message from the UE, the capability message indicating support for PMO based timeline measurement, span based timeline measurement, or PMO and span based timeline measurement, wherein the determined resources are based on the capability message.

30. The apparatus of claim 29, wherein the capability message indicates support for PMO and span based timeline measurement, and wherein the processor is further configured to:
transmit a selection to the UE, the selection indicating PMO based timeline measurement or span based timeline measurement.

31. The apparatus of claim 30, wherein the selection indicates span based timeline measurement and the determined resources are based on the selection.

32. The apparatus of claim 26, wherein the processor is further configured to:
transmit a plurality of transmissions to the UE on a plurality of bandwidth parts (BWPs); and
receive a timeline measurement indicator for each BWP of the plurality of BWPs from the UE, wherein each timeline measurement indicator indicates support for span based timeline measurement, PMO based timeline measurement, or both span and PMO based timeline measurement for the corresponding BWP.

33. The apparatus of claim 32, wherein the PDCCH is transmitted on an initial BWP of the plurality of BWPs, and wherein the timeline measurement indicator for the initial BWP indicates support for span based timeline measurement, or wherein the timeline measurement indicators of the plurality of BWPs other than the initial BWP indicate support for at least one of a PMO based timeline measurement or a span and PMO based timeline measurement.

34. The apparatus of claim 26, wherein a number of symbols between a last symbol of the span and an initial symbol of the determined resources is equal to or greater than the number of symbols of the processing time parameter.

35. A non-transitory computer-readable medium storing computer executable code, the code when executed by a processor of an apparatus, causes the processor to:
transmit a processing time parameter to a base station, the processing time parameter corresponding to a number of symbols;
receive a physical downlink control channel (PDCCH) from a base station during a PDCCH monitoring occasion (PMO) in a span;
process the PDCCH received in the PDCCH monitoring occasion to determine resources for a scheduled channel, a number of symbols between a last symbol of the span and an initial symbol of the determined resources being equal to or greater than the number of symbols of the processing time parameter; and
transmit or receive data on the scheduled channel based on the processed PDCCH.

\* \* \* \* \*